United States Patent
Huang et al.

(10) Patent No.: US 8,259,266 B2
(45) Date of Patent: Sep. 4, 2012

(54) LIQUID CRYSTAL DISPLAY DEVICE HAVING PARTICULAR DUAL ADHESIVE LAYER MODULE

(75) Inventors: Chien-Cheng Huang, Hsin-Chu (TW); Wei-Chun Hsu, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 650 days.

(21) Appl. No.: 12/543,147

(22) Filed: Aug. 18, 2009

(65) Prior Publication Data

US 2010/0171915 A1  Jul. 8, 2010

(30) Foreign Application Priority Data

Jan. 8, 2009 (TW) ............................... 98100529 A (51) Int. Cl.
*G02F 1/1333* (2006.01)
*G02F 1/13* (2006.01)
(52) U.S. Cl. ...................................... 349/122; 349/192
(58) Field of Classification Search .................. 349/122, 349/192
See application file for complete search history.

(56) References Cited

U.S. PATENT DOCUMENTS

| 6,597,416 B1 * | 7/2003 | Momose ........................ 349/60 |
| 7,542,105 B2 * | 6/2009 | Sato et al. ........................ 349/58 |
| 7,760,285 B2 * | 7/2010 | Park et al. ........................ 349/58 |
| 7,800,730 B2 * | 9/2010 | Kang et al. ..................... 349/149 |
| 7,911,555 B2 * | 3/2011 | Fukayama et al. .............. 349/58 |

FOREIGN PATENT DOCUMENTS

| JP | H07-270790 | 10/1995 |
| JP | 2000-293309 | 10/2000 |
| JP | 2003-050393 | 2/2003 |

OTHER PUBLICATIONS

English language translation of abstract of JP 2000-293309.
English language translation of JP H07-270790.
English language translation of abstract of JP 2003-050393.

* cited by examiner

*Primary Examiner* — Mike Qi
(74) *Attorney, Agent, or Firm* — Thomas, Kayden, Horstemeyer & Risley, LLP (57) ABSTRACT

An LCD device having a backlight module, a display module and an adhesive layer is provided. The backlight module has an inner fringe for holding the display module. The display module sequentially includes a lower polarizer, a display panel and an upper polarizer. The edge of the upper surface of the display panel is exposed because the area of the upper polarizer is smaller than the area of the display panel. The adhesive layer has a first adhesive film and a second adhesive film. The display module is disposed on the inner fringe of the backlight module by using the adhesive layer wherein the first adhesive film is on the side wall of the backlight module and portion of the edge of the upper surface of the display panel, the second adhesive film is on the portion of the first adhesive film and the exposed edge of upper surface of the display panel.

22 Claims, 8 Drawing Sheets

LIQUID CRYSTAL DISPLAY DEVICE HAVING PARTICULAR DUAL ADHESIVE LAYER MODULE

RELATED APPLICATIONS

This application claims priority to Taiwan Application Serial Number 98100529, filed Jan. 8, 2009, which is herein incorporated by reference.

BACKGROUND

1. Field of Invention

The present invention relates to a dual adhesive layer module. More particularly, the present invention relates to an liquid crystal display device (LCD device) with the dual adhesive layer module and a rework method thereof.

2. Description of Related Art

In recent years, due to the progress in the photoelectric technology and the coming of the digital era, the development of LCD device market continues to prosper. The LCD device has the advantages of high definition, small volume, light weight, low drive voltage, and low power consumption, etc, and therefore the LCD device is applied extensively in the PDA, mobile phone, camcorder, laptop computers, desktop monitors, automotive display device, projection TVs, and other consumer communication or electronic products, so the LCD device has gradually replaced the cathode-ray tube and become mainstream.

The present LCD device is aimed at lightweight and thin-based design, especially in the portable device. Meanwhile, it is necessary to get the cost of material and manufacture down so that there exists a conflict between the overall system design and the strength of the LCD device structure.

Figure 1:
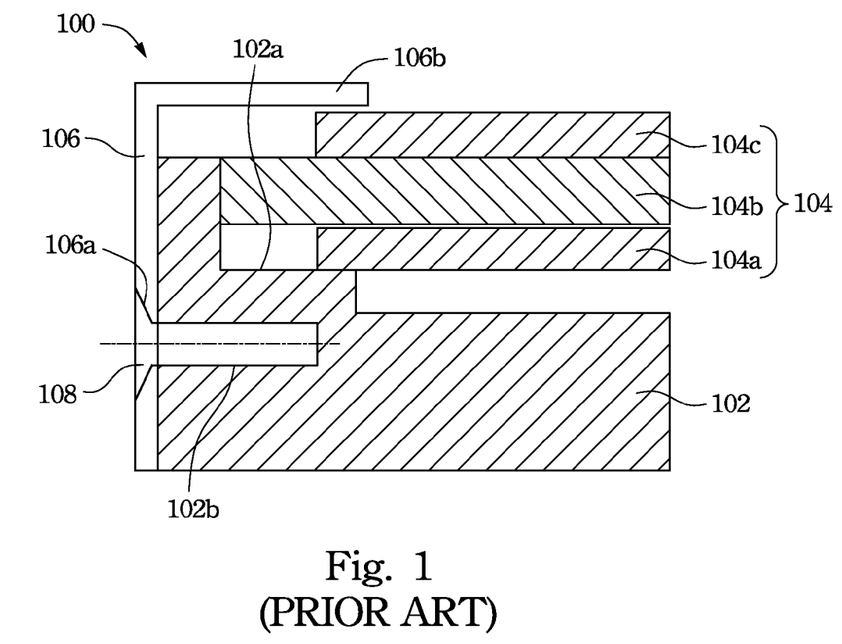
FIG. 1 shows a cross section view of a portion of a conventional LCD device.

The prior art in the LCD device, the display module is screwed to the back light module. FIG. 1 shows a cross section view of a portion of a conventional LCD device. Referring to FIG. 1, the LCD device 100 includes the backlight module 102, the display module 104 and front frame 106. The display module 104 includes a lower polarizer 104a, a display panel 104b and an upper polarizer 104c, wherein the display module 104 is equipped at an inner fringe 102a of the backlight module 102. The front frame 106 is L-type and there is an opening at the top of the front frame. A screw 108 is inserted into tapped hole 102b of the side wall of backlight module 102 through the opening 106a so that the front frame 106 is fixed on the side wall of the backlight module 102. Simultaneously, the upper arm 106b can be fixed the display module 104 at the inner fringe 102a of the backlight module 102.

It takes much material and manpower to have display module 104 fixed at the inner fringe 102a of the backlight module 102. Furthermore, as shown in FIG. 1, if there is any defect on the upper polarizer 104c, the upper polarizer 104c must be peeled off and re-adhere another upper polarizer on the display panel 104b, so the screw 108 is needed to be loosed to take off the front frame 106 and then have the display module 104 and the backlight module 102 separated from each other. Because the display module 104 has been separated from the backlight module 102, it is easy to cause damage on the lower polarizer 104a, so another protective film is need to paste on the lower polarizer 104a. The protective film will not be peeled off until after the rework has been done. After that, the rework goes to screw the front frame 106 to the backlight module 102. Therefore, It takes much time and manpower to do the rework of the upper polarizer with the prior art method.

SUMMARY

An LCD device is provided according to the present invention. The LCD device comprises a backlight module, a display module and an adhesive layer. The backlight module has an inner fringe. The display module sequentially includes a lower polarizer, a display panel and an upper polarizer. The edge of the upper surface of the display panel is exposed because the area of the upper polarizer is smaller than the area of the display panel. The adhesive layer has a first adhesive film and a second adhesive film. The display module is disposed on the inner fringe of the backlight module by using the adhesive layer, wherein the first adhesive film is on the side wall of the backlight module and portion of the edge of the upper surface of the display panel, the second adhesive film is on the portion of the first adhesive film and the exposed edge of upper surface of the display panel. The adhesive layer at least adheres one of four side edges of the LCD device.

The first adhesive film has a smooth upper surface or a release upper surface, and the first adhesive film can be stretched to a bottom of the backlight module selectively. The width of the second adhesive film can be shorter than or equal to the width of the first adhesive film.

In a better embodiment of this invention, the backlight module can have a notch, and the second adhesive film covers a portion of the notch. In another better embodiment of present invention, the backlight module can have a notch, and the first adhesive film covers a portion of the notch.

Present invention also provides a rework method of the upper polarizer of the LCD device, wherein the adhesive layer comprises a first adhesive film and a second adhesive film. The display module is disposed on the inner fringe of the backlight module by using the adhesive layer wherein the first adhesive film is on the side wall of the backlight module and portion of the edge of the upper surface of the display panel, and the second adhesive film is on the portion of the first adhesive film and the exposed edge of upper surface of the display panel. The method comprises the steps of peeling off the second adhesive film of at least one side of the display module to expose the edge of the upper surface, removing the upper polarizer and adhering another upper polarizer.

Present invention is also to provide a dual adhesive layer module, which is used for fixing a display module to a backlight module. The dual adhesive layer module comprises a release layer and an adhesive layer. The adhesive layer comprises a first adhesive film and a second adhesive film. The first adhesive film laminates directly to the release layer and the second adhesive film laminates directly to the first adhesive film and the release layer, wherein the overlap portion of the first adhesive film and the second adhesive film is located on the same surface of release layer.

While using the adhesive layers to fix the display module on the backlight module, it is unnecessary to take apart the LCD device to do the rework with the upper polarizer. It only needs to peel off a portion of the second adhesive layers in order to have a portion of the upper surface of the display panel exposed, and then there will be enough space to operate the step of peeling off the upper polarizer. It will also provide more operation allowance to re-adhere the upper polarizer, so the inaccuracy of adherence can be overcome easily. Furthermore, the LCD device that the present invention provides can proceed to peel off the upper polarizer without taking apart the display module from the backlight module, and therefore the rework can proceed directly. Additionally, the application of the LCD device that present invention provides can decrease the risk of breaking the thin glass in the display module and the extra disassembly action so as to minimize the cost of labor.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows:

FIG. 7A to FIG. 7E show schematic diagrams of the LCD device in terms of every step in FIG. 6.

DETAILED DESCRIPTION

Figure 2:
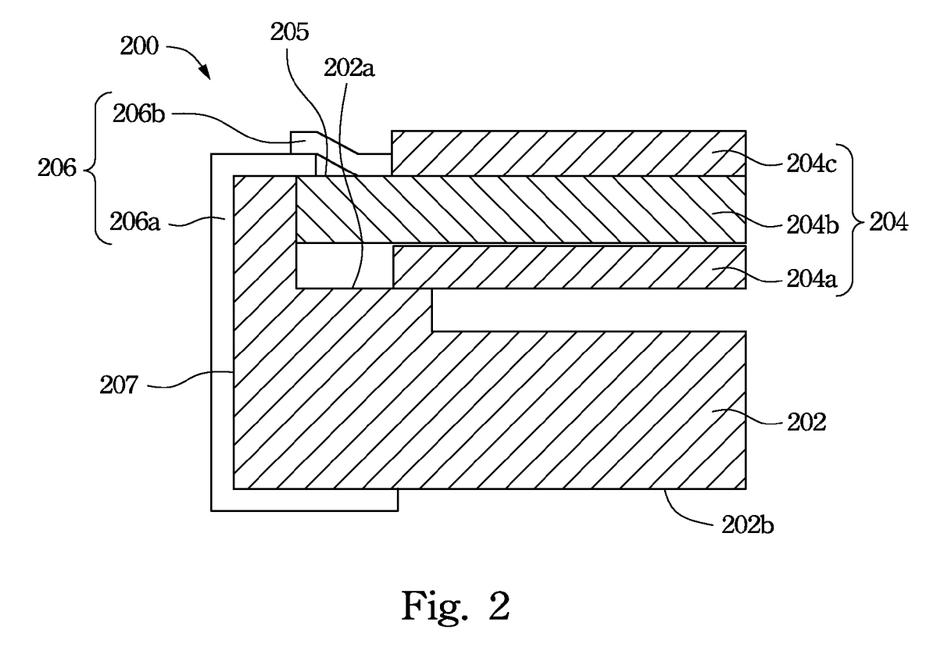
FIG. 2 shows a cross section view of a portion of an LCD device according to a better embodiment of the present invention.

FIG. 2 shows a cross section view of a portion of an LCD device according to a preferable embodiment of the present invention. Referring to FIG. 2, an LCD device 200 including a backlight module 202, a display module 204 and an adhesive layer 206 is provided. The backlight module 202 provides a light source for the display module 204, and the backlight module 202 has an inner fringe 202a for supporting the display module. The display module 204 sequentially includes a lower polarizer 204a, a display panel 204b and an upper polarizer 204c, wherein the edge 205 of the upper surface of the display panel 204b is exposed because the upper polarizer 204c is smaller than the display panel 204b. The adhesive layer 206 includes a first adhesive film 206a and a second adhesive film 206b.

The display module 204 is disposed on the inner fringe 202a of the backlight module 202. In this embodiment, the first adhesive film 206a is on both the side wall 207 of the backlight module 202 and a portion of the edge 205 of the upper surface of the display panel 204b, wherein the side wall 207 represents the top surface and the side surface of the backlight module 202. In addition, the first adhesive film 206a may be stretched to the bottom 202b of the backlight module 202, and this would enhance the fixed strength and the stability of the backlight module 202 and the display module 204. In another embodiment, if the first adhesive film 206a stretched to a side wall 207 of the backlight module 202 can provide enough fixed strength, it is unnecessary to have the first adhesive film 206a stretched to the bottom 202b of the backlight module 202, so the cost of material would be decreased. In another preferable embodiment, the first adhesive film 206a has a smooth upper surface or release upper surface, so it is easier to peel off the second adhesive film 206b. Furthermore the material or characteristic of the surface can be adjusted according to the practical demand.

Figure 3:
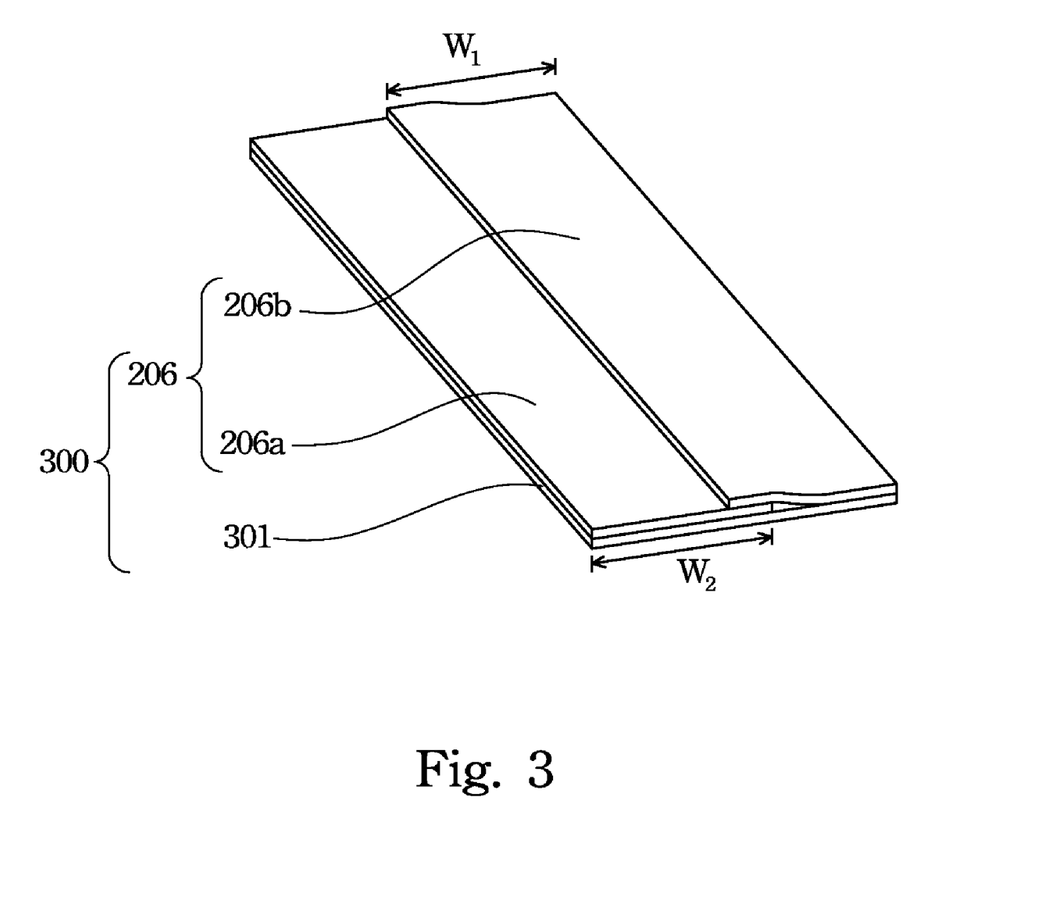
FIG. 3 shows the structure of a dual adhesive layer module provided by the present invention.

Referring again to FIG. 2, the second adhesive film 206b is adhered to a portion of the first adhesive film 206a and the portion of the edge 205 of the upper surface of the display panel 204b, which is uncovered by the first adhesive film 206a. In addition, an edge of the second adhesive film 206b that is close to the upper polarizer 204c substantially fits well to an edge of the upper polarizer 204c so as to avoid the leakage of light. The material of the first adhesive film 206a or the second adhesive film 206b may be light-absorbing material such as dark colored material or reflective material to prevent from leaking the light. In order to match the size and proportion of the LCD device 200, the width W1 of the second adhesive film 206b may be shorter than or equal to the width W2 of the first adhesive film 206a (shown in FIG. 3). The width of the first adhesive film and the second adhesive film can also be adjusted according to the actual demand. FIG. 3 shows the structure of a dual adhesive layer module 300 provided by the present invention. The dual adhesive layer module 300 includes a release layer 301 and an adhesive layer 206. The adhesive layer 206 includes a first adhesive film 206a and a second adhesive film 206b. The first adhesive film 206a is adhered directly to the release layer 301. The second adhesive film 206b is adhered directly to the first adhesive film 206a and the release layer 301, wherein the overlap portion of the first adhesive film 206a and the second adhesive film 206b is located on the same surface of the release layer 301. When the dual adhesive layer module 300 is used to fix the backlight module and the display module, the first step is to fetch the proper length, and then it just needs to peel off the release layer 301 to adhere. The related structure is shown in FIG. 2.

Figure 4A:
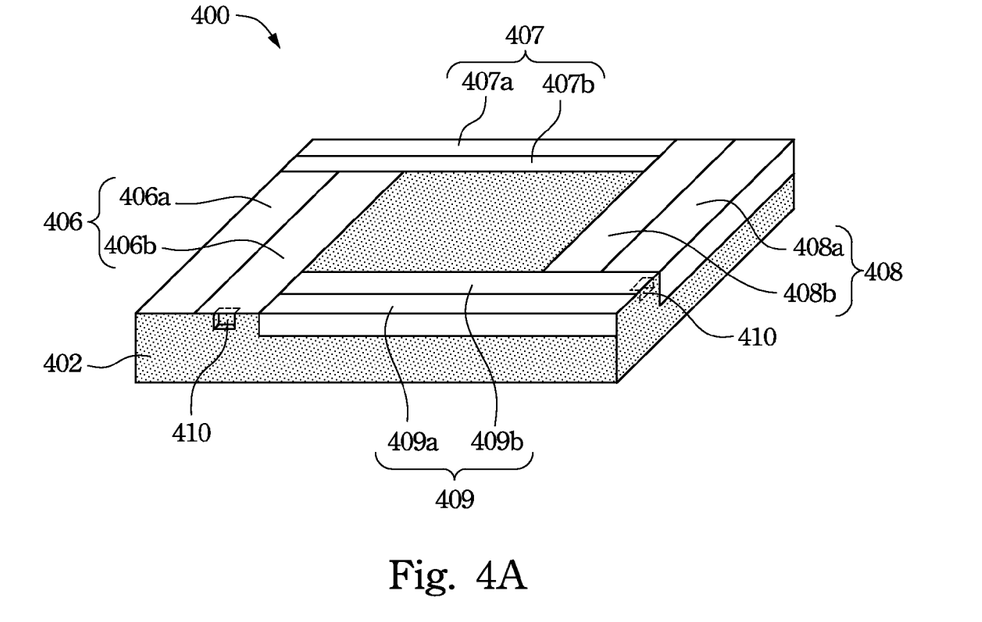
FIG. 4A and FIG. 4B show schematic diagrams of the LCD device according to another embodiment of the present invention.

Referring to FIG. 4A, it shows a schematic diagram of the LCD device according to another preferable embodiment of the present invention. The adhesive layers 406, 407, 408 and 409 can be adhered to four sides of the surface of the LCD device 400. The adhesive layer 406 includes a first adhesive film 406a and a second adhesive film 406b. The adhesive layer 407 includes a first adhesive film 407a and a second adhesive film 407b. The adhesive layer 408 includes a first adhesive film 408a and a second adhesive film 408b. The adhesive layer 409 includes a first adhesive film 409a and a second adhesive film 409b. The first adhesive films 406a, 407a, 408a and 409a are stretched to the side wall of the backlight module 402. As mentioned above, the first adhesive films 406a, 407a, 408a and 409a can also be stretched to the bottom of the backlight module 402 so as to enhance the fixed strength and the stability of the backlight module 402 and the display module. In this embodiment, two adjacent adhesive films will not overlap with each other, such as the adjacent adhesive layers 406 and 409, so it can maintain the planarization of the surface of the LCD device 400 and will not cause nonuniform surface thickness of the LCD device 400. In addition, in other embodiments, the adhesive layers can only be adhered to three sides, two adjacent sides, two opposite sides or just one side of the surface of the LCD device 400. The distribution and application of the adhesive layers can adjust according actual demand so as to have the display module fixed on the backlight module effectively.

Figure 4B:
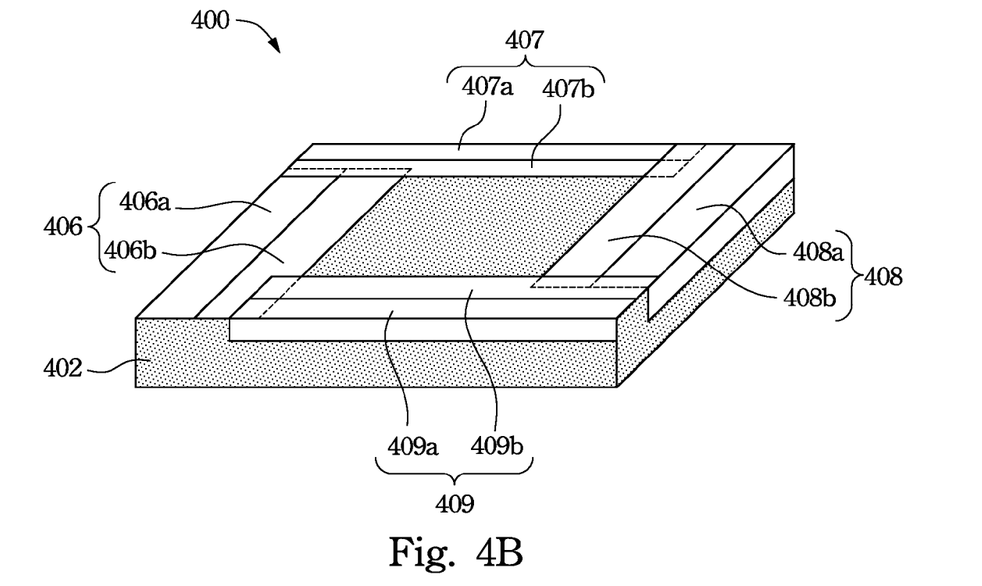

In other embodiments, two adjacent adhesive layers will overlap with each other partially to enhance the fixed strength and the stability of the backlight module and the display module. As shown in FIG. 4B, the adhesive layer 406 partially overlaps with the adhesive layers 407 and 409, respectively; the adhesive layer 407 partially overlaps with the adhesive layers 406 and 408, respectively; the adhesive layer 408 partially overlaps with the adhesive layers 407 and 409, respectively; the adhesive layer 409 partially overlaps with the adhesive layers 406 and 408, respectively in order to enhance the fabrication stability. In detail, the order of adhering the adhesive films is to adhere the adhesive layer 406 first and then adhere the adhesive layer 407, wherein the adhesive layers 406 and 407 partially overlap with each other. The next order is to adhere the adhesive layer 408 to the LCD device so that the adhesive layers 408 and 407 partially overlap with each other. Afterward the order is to adhere the adhesive film 409 to the LCD device so that the adhesive films 409 and 408 partially overlap with each other. This kind of adhering method and the order of adhering method is only an example, and the present invention will not be limited to the above description. The invention can be adjusted according to the actual demand. The adhering method of partially overlapping the adhesive layers with each other can enhance the fixed strength and the stability of the backlight module and the display module. Additionally, in another preferable embodiment, there are one adhesive layer and another adhesive layer overlapped with each other. The overlapped portion does not exceed the position of the second adhesive film of other adhesive layers, so it will be easier to peel off while doing the rework. For example, the adhesive layer 407 partially overlaps with the adhesive layer 406, and the overlapping portion of the adhesive layer 406 and the adhesive layer 407 does not exceed the second adhesive film 407b of the adhesive layer 407. That is to say, this design can provide a much more convenient way to peel off the second adhesive film. Accordingly, while doing the rework, the first step is to peel off the second adhesive film 409b, and then the rework continues to peel off the second adhesive film 408b and 407b orderly. These method and order of peeling off the adhesive film are only examples, so the present invention will not be limited to the above description and can be adjusted according to the actual demand. In addition, it is unnecessary to peel off all the second adhesive films. If it is more convenient to do the rework, then the method can adjust to peel off only one of the second adhesive films, two of the second adhesive films that are adjacent with each other, two of the second adhesive films that are opposite to each other or three of the second adhesive films, according to the actual demand.

Figure 5:
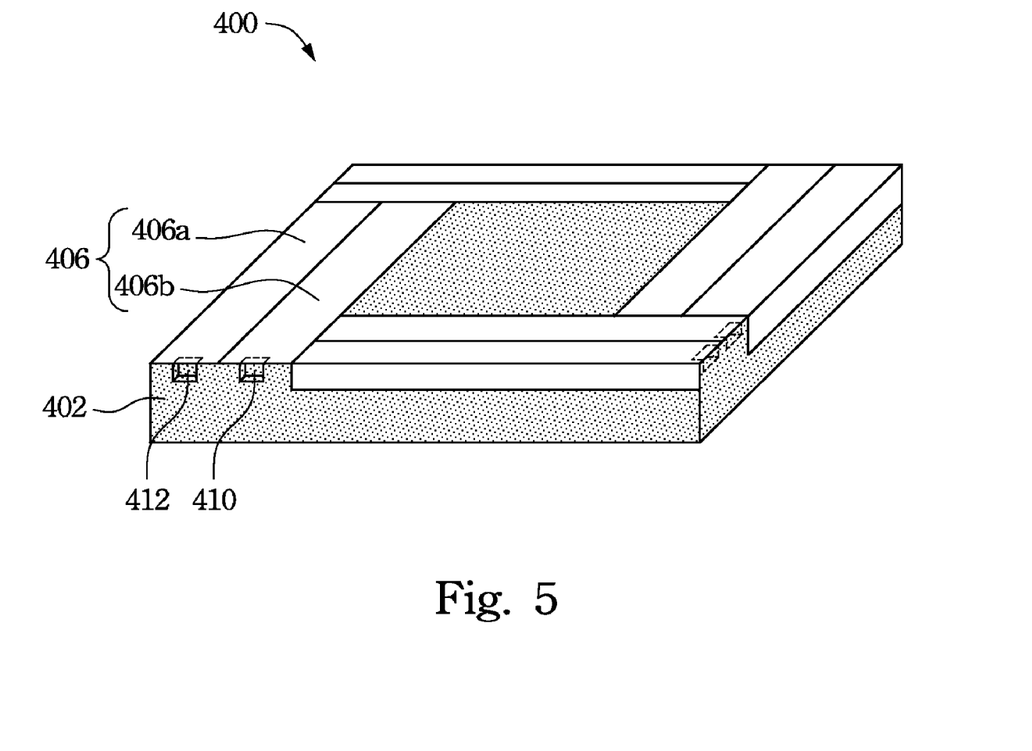
FIG. 5 shows a schematic diagram of the LCD device according to another better embodiment of the present invention.

Referring again to FIG. 4A, the backlight module 402 may have a notch 410, which can span across a portion of the top surface and a portion of the side surface of backlight module 402, and the second adhesive film 406b covers a portion of the notch 410. Referring to FIG. 5, it shows a schematic diagram of the LCD device according to another preferable embodiment of the present invention. In this preferable embodiment of the present invention, as shown in FIG. 5, the difference with the embodiment in FIG. 4A is that the backlight module 402 has a notch 412, which can span across a portion of the top surface and a portion of the side surface backlight module 402, and the first adhesive film 406a covers a portion of the notch 412. The settlement of the notch 410 makes it much easier to peel off the second adhesive film 406b, and the settlement of the notch 412 also makes it easier to peel off the second adhesive film 406a. The present invention is not limited to what the figure has shown, it can depend on the actual demand to decide whether the backlight module is to have the notch or not, the number of the notch, the distribution of the notch or the size of the covered notch.

The present invention also provides a rework method of an upper polarizer of an LCD device, wherein the display module and the backlight module is fixed by an adhesive layer. Referring to FIG. 6, and FIG. 7A to FIG. 7E, FIG. 6 shows the flowchart of the rework in the LCD device. FIG. 7A to FIG. 7E show schematic diagrams of the LCD device with every step proceeded in FIG. 6.

Figure 7A:
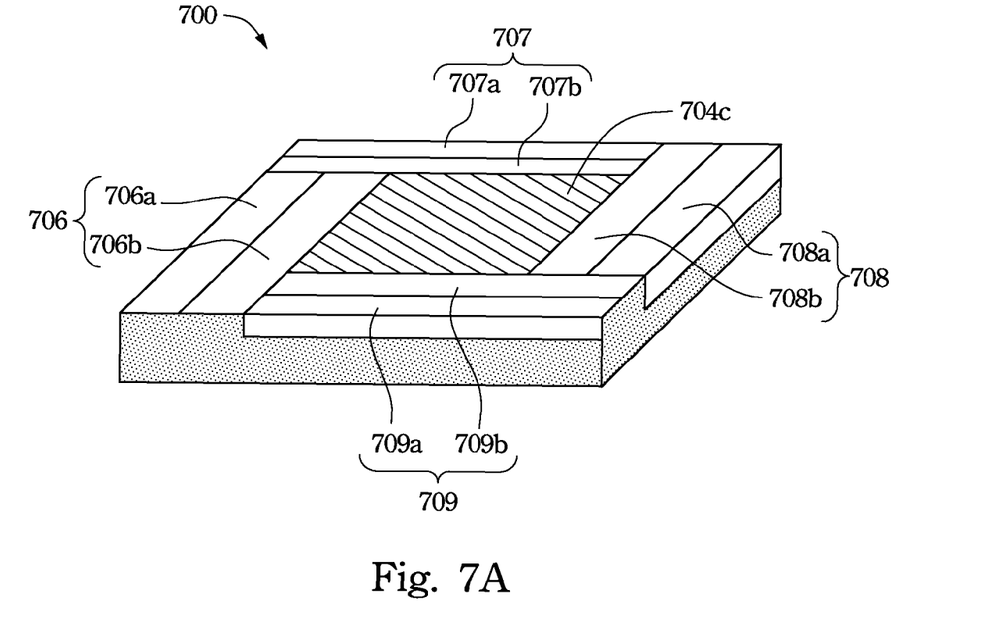

As shown in FIG. 7A, the adhesive layer 706 of the LCD device 700 comprises the first adhesive film 706a and the second adhesive film 706b. The adhesive layer 707 comprises the first adhesive film 707a and the second adhesive film 707b. The adhesive layer 708 comprises the first adhesive film 708a and the second adhesive film 708b. The adhesive layer 709 comprises the first adhesive film 709a and the second adhesive film 709b. Before doing the rework, the adherence of the adhesive layers 706, 707, 708 and 709 can make the edge of the second adhesive films 706b, 707b, 708b and 709b adjacent to the edge of the upper polarizer. This kind of adhering method and the order of adhering method is only an example, and the present invention will not be limited to the above description. The invention can be adjusted according to the actual demand.

Figure 6:
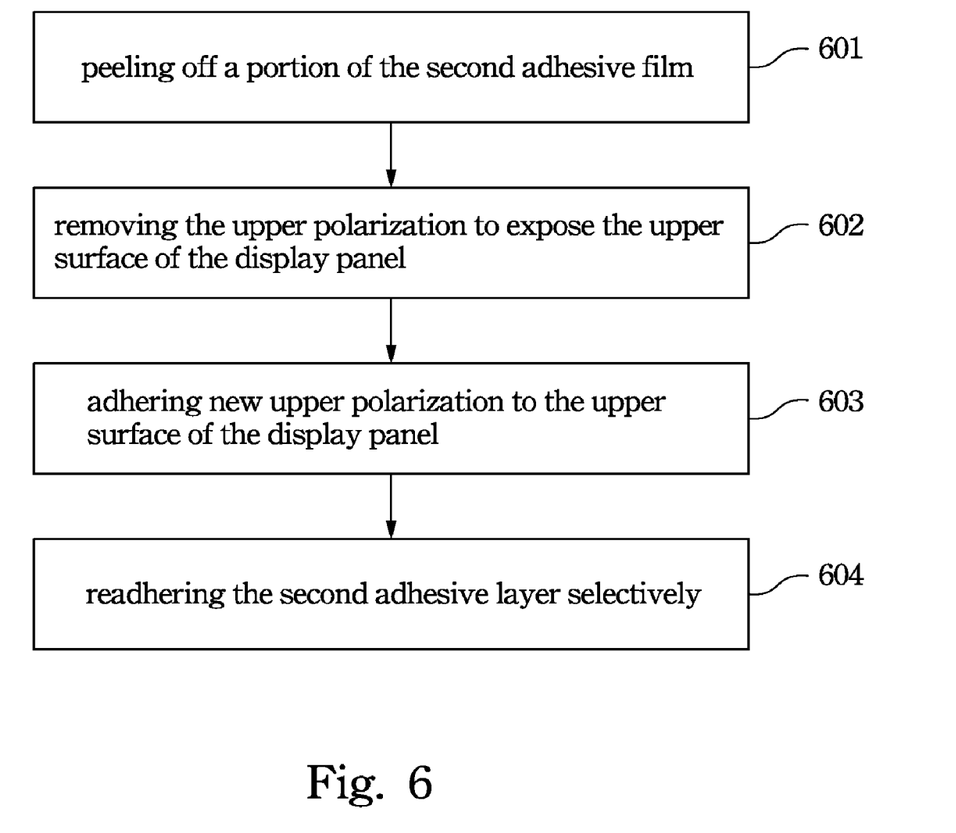
FIG. 6 shows the flowchart of the rework in the LCD device.

Referring to the FIG. 6, FIG. 6 shows the flowchart of the rework in the LCD device. First of all, the step 601 is to peel off the portion of the second adhesive film so as to enlarge operation allowance. The step 602 is to remove the upper polarizer so as to expose the upper surface of the display panel. The step 603 is to adhere new upper polarizer to the upper surface of the display panel. At last, step 604 is selective to adhere back to the adhesive layer, according to the actual demand.

Figure 7B:
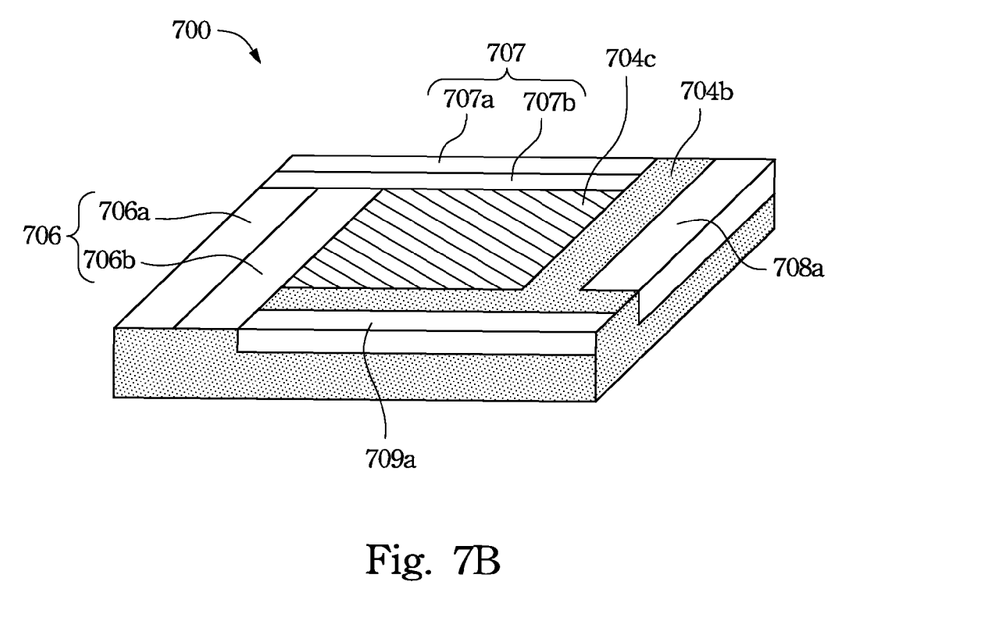
Figure 7C:
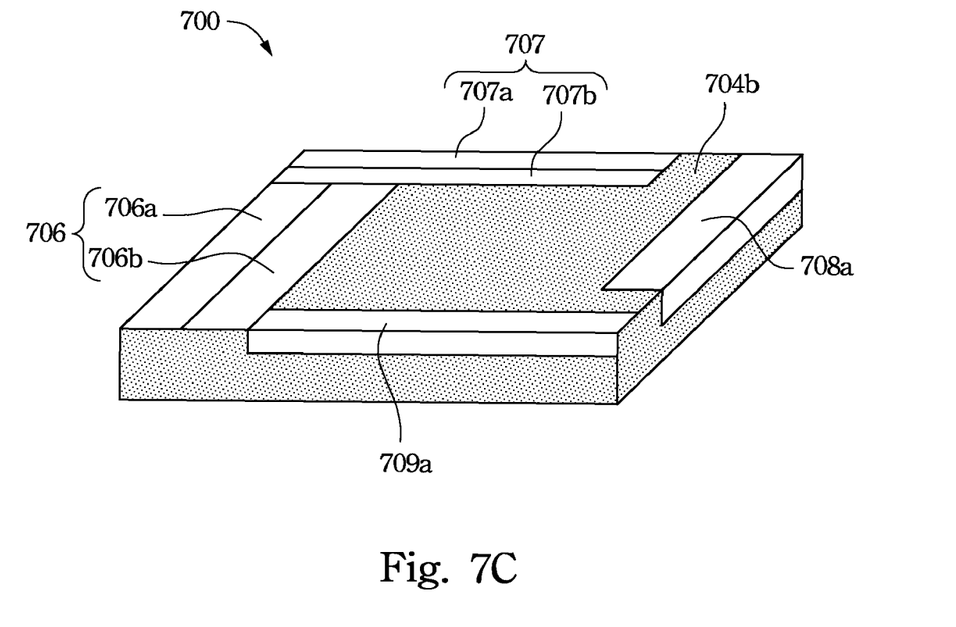
Figure 7D:
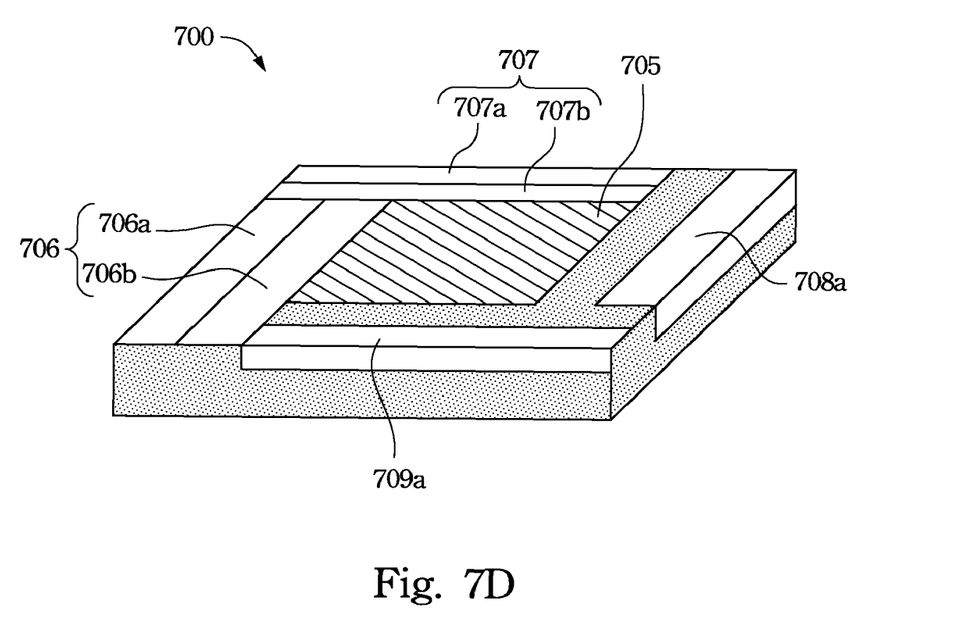
Figure 7E:
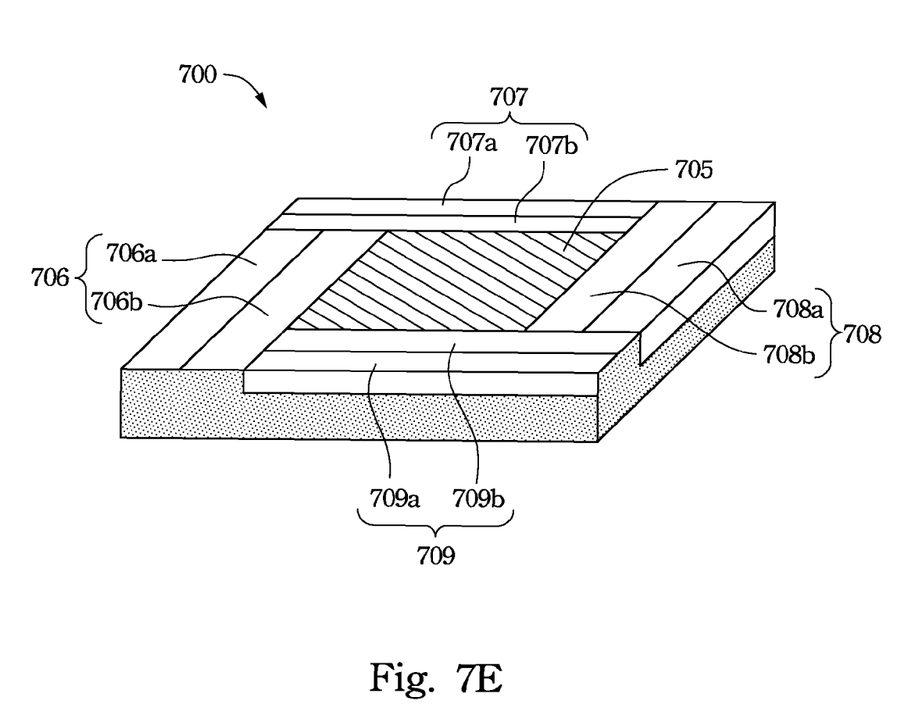

While proceeding the rework with the upper polarizer 704c of the LCD device 700 shown in FIG. 7A in terms of the flowchart in FIG. 6, firstly in terms of the step 601, the procedure is to peel off the second adhesive films 708b and 709b which are on the two sides of the LCD device 700 in order to expose the portion edge of the upper surface edge of the display panel 704b, so the structure is to become what has shown in FIG. 7B and provides the operation allowance for peeling off the upper polarizer 704c. Next, in terms of step 602, the procedure is to remove the upper polarizer 704c to expose the upper surface of the display panel 704b, so the structure is to become what has shown in FIG. 7c. At last, in terms of step 603, the procedure is to adhere new upper polarizer 705 to the upper surface of the display 704b, so the structure is to become what has shown in FIG. 7D. Eventually, in terms of step 604, selectively adhere the second adhesive film back to the LCD device according to the actual demand, so the structure is to become what has shown in FIG. 7E. If the entire structure of the LCD device is strong, it is unnecessary to adhere the second adhesive layers back to the LCD device, so the step 604 can be ignored. Adhering the second adhesive films back to the LCD device comprises adhering the second or third adhesive films back to the position where the second adhesive film had been peeled off, and the material of the third adhesive films can be the same as the material of the second adhesive film. As to the step 603, before adhering new upper polarizers to the upper surface of the display panel 704b, it can further include a step of cleaning, which is to eliminate the residue glue on the portion edge of upper surface of the display panel 704b, in order to avoid having influence on the effect of adhering the new upper polarizer.

In the step 603 of adhering the new upper polarizer 705, due to the tolerance of adherence, peeling off the second adhesive films 708b and 709b makes the display panel 704b, whose upper polarizer had been removed, have more operation allowance, when the upper polarizer is being re-adhered to the exposed upper surface, so adhering the new upper polarizer will avoid to adhere the polarizer to the adhesive layer. In addition, the operation allowance in adhering the new upper polarizer will be larger because of the surface exposed on the display 704b, so the rework of the second adhesive films can be done without taking apart the display module from the backlight module. In other embodiment, it can also remove a single second adhesive film, three-second adhesive films or all the second adhesive films to do rework. The portion of the first adhesive films 706a, 707a, 708a or 709a can be removed selectively to do rework, if necessary. In addition, the entire adhesive layer can also be removed, such as removing a single adhesive layer, two adjacent adhesive layers, three adhesive layers or all the adhesive layers. The adjustment can depend on the actual requirement to choose. The notch shown in FIG. 4 and FIG. 5 is used to provide much more convenience for peeling off the second adhesive film or the first adhesive film above it.

According to the preferable embodiments described above, the application of the present invention has the following merits. Using the adhesive layers instead of the screw to fix the display module on the backlight module can decrease the time consumption of assembling the LCD device and make the operation much easier. Furthermore, the LCD device that the present invention provides can proceed to peel off the upper polarizer without taking apart the display module from the backlight module, and therefore the rework can proceed directly. Additionally, the application of the LCD device that present invention provides can decrease the risk of breaking the thin glass in the display module and omit the extra disassembly action so as to minimize the cost of manpower. Replacing the front frame with the adhesive films can also save cost.

Although the present invention has been described in considerable detail with reference certain embodiments thereof, other embodiments are possible. Therefore, their spirit and scope of the appended claims should no be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An LCD device comprising:
   a backlight module having an inner fringe;
   a display module disposed on the inner fringe, comprising:
      a lower polarizer;
      a display panel arranged above the lower polarizer; and
      an upper polarizer arranged above the display panel, wherein the upper polarizer is smaller than the display panel so that an edge of the upper surface of the display panel is exposed; and
   an adhesive layer comprising:
      a first adhesive film adhered to both a portion of the edge of the upper surface of the display panel and a side wall of the backlight module; and
      a second adhesive film adhered to both a portion of the first adhesive film and the portion of the edge of the upper surface of the display panel which is uncovered by the first adhesive film.

2. The LCD device of claim 1, wherein the first adhesive film has a smooth upper surface.

3. The LCD device of claim 1, wherein the first adhesive film has a release upper surface.

4. The LCD device of claim 1, wherein the first adhesive film is stretched to a bottom of the backlight module.

5. The LCD device of claim 1, wherein an edge of the second adhesive film, which is closed to the upper polarizer, fits well to an edge of the upper surface substantially.

6. The LCD device of claim 1, wherein the backlight module has a notch, and the second adhesive film covers a portion of the notch.

7. The LCD device of claim 1, wherein the backlight module has a notch, and the first adhesive film covers a portion of the notch.

8. The LCD device of claim 1, wherein the adhesive layer at least adheres one of four side edges of the LCD device.

9. The LCD device of claim 1, wherein the adhesive layer comprises a first adhesive layer and a second adhesive layer, which adhere to two sides of four side edges of the LCD device respectively.

10. The LCD device of claim 9, wherein the first adhesive layer overlaps the second adhesive layer partially.

11. The LCD device of claim 1, wherein the width of the second adhesive film is shorter than or equal to the width of the first adhesive film.

12. A rework method of an upper polarizer of an LCD device, the LCD device comprising a backlight module, a display module disposed on an inner fringe of the backlight module and an adhesive layer, wherein the display module sequentially comprises a lower polarizer, a display panel and an upper polarizer, and the adhesive layer comprises a first adhesive film, which is adhered to both a portion of the edge of the upper surface of the display panel and a side wall of the backlight module, and a second adhesive film, which is adhered to both a portion of the first adhesive film and the portion of the edge of the upper surface of the display panel, which is uncovered by the first adhesive film, comprising:
   peeling off the second adhesive film of at least one side of the display module to expose the edge of the upper surface;
   removing the upper polarizer; and
   adhering another upper polarizer.

13. The rework method of claim 12, wherein the steps of peeling off the second adhesive film of at least one side of the display module to expose the edge of the upper surface, comprising:
   peeling off the second adhesive film of another side, which is adjacent to the side of the display module.

14. The rework method of claim 12, wherein the steps after peeling off the second adhesive film of at least one side of the display module to expose the edge of the upper surface, further comprising:
   peeling off the first adhesive film of the side of the display module.

15. The rework method of claim 12, wherein the steps of peeling off at least the second adhesive film of at least one side of the display module to expose the edge of the upper surface, further comprising:
   peeling off all the second adhesive films.

16. The rework method of claim 12, wherein after adhering another upper polarizer, further comprising:
   re-adhering the second adhesive films that had been peeled off.

17. The rework method of claim 12, wherein after adhering another upper polarizer, further comprising:
   adhering a third adhesive film to the position where the second adhesive film is peeled off, wherein the material of the third adhesive film and the second adhesive film are both the same.

18. The rework method of claim 12, wherein before adhering another upper polarizer, further comprising:

providing a cleaning step to remove the residue glue on the exposed part of the edge of the upper surface.

19. A dual adhesive layer module for fixing a display module to a backlight module comprising:
   a release layer; and
   an adhesive layer comprising:
   a first adhesive film adhered directly to the release layer; and
   a second adhesive film adhered directly to both the first adhesive film and the release layer, wherein the overlap portion of the first adhesive film and the second adhesive film is located on the same surface of the release layer.

20. The dual adhesive layer module of claim 19, wherein the first adhesive film has a smooth upper surface.

21. The dual adhesive layer module of claim 19, wherein the first adhesive film has a release upper surface.

22. The dual adhesive layer module of claim 19, wherein the width of the second adhesive film is shorter than or equal to the width of the first adhesive film.

* * * * *